United States Patent [19]  [11] 4,384,080
Matsubara et al.  [45] May 17, 1983

[54] PROCESS FOR PREPARING HYDROGENATED HYDROCARBON RESIN

[75] Inventors: Saburo Matsubara, Yokohama; Sakuya Iwai, Tokyo, both of Japan

[73] Assignee: Nippon Oil Company, Limited, Tokyo, Japan

[21] Appl. No.: 278,119

[22] Filed: Jun. 29, 1981

[30] Foreign Application Priority Data

Jul. 4, 1980 [JP] Japan ................................. 55-90690

[51] Int. Cl.$^3$ ................................................ C08F 8/04
[52] U.S. Cl. ....................................... 525/338; 526/212
[58] Field of Search .............. 525/339, 338; 526/212, 526/290

[56] References Cited

U.S. PATENT DOCUMENTS 4,297,450 10/1981 Sato ................................... 525/333
4,342,850 8/1982 Allen ................................. 525/339

FOREIGN PATENT DOCUMENTS 766894 1/1957 United Kingdom .

*Primary Examiner*—Paul R. Michl
*Attorney, Agent, or Firm*—Jordan and Hamburg

[57] ABSTRACT

A process for preparing a hydrogenated hydrocarbon resin is provided which comprises the steps of: (A) polymerizing 100 parts by weight of a hydrocarbon mixture containing fractions of cracked oils obtained by cracking of petroleum and having boiling points ranging within from 140° to 280° C., said polymerization being effected in the presence of 0.1 to 3.0 parts by weight of a phenol and 0.01 to 5.0 parts by weight of a Friedel-Crafts catalyst at − (minus) 30° C. to + (plus) 60° C. to obtain a polymerized hydrocarbon mixture; (B) adding 0.1 to 20 parts by weight of a basic substance to 100 parts by weight of said polymerized hydrocarbon mixture, to neutralize said polymerized hydrocarbon mixture at 10° to 100° C.; (C) further adding an activated clay in an amount of 0.1 to 20 parts by weight based on 100 parts by weight of said polymerized hydrocarbon mixture, to treat said neutralized hydrocarbon mixture with said activated clay at 10° to 100° C.; and (D) hydrogenating said hydrocarbon mixture treated with said activated clay.

11 Claims, No Drawings

PROCESS FOR PREPARING HYDROGENATED HYDROCARBON RESIN

BACKGROUND OF THE INVENTION

1. Field of the Invention

This invention relates to a process for preparing a hydrogenating hydrocarbon resin.

2. Prior Art

Hydrocarbon resins have been used in adhesives and tackifiers as tackifying resins for providing the adhesive or tackifying properties to a variety of high polymers including rubbers such as natural rubber, SBR and chloroprene, ethylenic copolymers and waxes. Generally used tackifying resins are resins of natural origin, such as rosin and terpene resins, and a variety of petroleum resins. Amongst them, the rosin and terpene base resins have been widely used, since the former is excellent in adhesive and tackifying properties and is also soft at a low temperature and the latter is excellent in thermal stability. However, both of these resins are produced from natural resources, resulting in high cost of the products accompanied with a problem of restricted resources.

Although there has been proposed the use of relatively inexpensive petroleum resins in place of the tackifying resins of natural origin, a petroleum resin having the properties equivalent or superior to the rosin and terpene base resins has not yet been developed. In detail, the petroleum resins are generally produced by polymerizing fractions of cracked oil which are obtained by cracking of petroleum of the like. The fractions subjected to polymerization are those having boiling points distributing in wide ranges, for example, 20° to 280° C., 20° to 140° C. and 140° to 280° C. The resins obtained by using the fractions of cracked oil having boiling points ranging within about 20° to 140° C. are aliphatic hydrocarbon resins which do not contain aromatic rings. However, these resins are high in degree of unsaturation and inferior in hue and thermal stability, since the starting oil mixtures thereof contain large amounts of conjugated or non-conjugated diolefins. On the other hand, the resins obtained by polymerizing the fractions of cracked oil having boiling points ranging within about 140° to 280° C. are aromatic hydrocarbon resins. However, the resins of this type are unsatisfactory in thermal stability and hue and inferior in adhesive and tackifying properties when used for adhesive and tackifier applications.

OBJECTS AND SUMMARY OF THE INVENTION

An object of this invention is to provide a process for preparing a hydrogenated hydrocarbon resin which is excellent in miscibility with a high molecular polymer and also excellent in heat resistant property and hue.

Another object of this invention is to provide a process for preparing a hydrogenated hydrocarbon resin which is synthesized from an abundant and inexpensive industrial material and yet can be used as a tackifying resin having superior properties equivalent to or improved over those of the terpene resins.

A further object of this invention is to provide a process for preparing a hydrogenated hydrocarbon resin suited for use as a traffic paint resin, a tackifier to be admixed to a rubber and a modifier resin for polyolefin and polyester resins.

Another object of this invention is to provide a process for preparing a hydrogenated hydrocarbon resin which exerts a strong adhesive power when used as a component of an adhesive composition.

The above and other objects and advantages of this invention will become apparent from the following description.

According to this invention, provided is a process for preparing a hydrogenated hydrocarbon resin comprising the steps of:

(A) polymerizing 100 parts by weight of a hydrocarbon mixture containing fractions of cracked oils obtained by cracking of petroleum and having boiling points ranging within from 140° to 280° C., said polymerization being effected in the presence of 0.1 to 3.0 parts by weight of a phenol and 0.01 to 5.0 parts by weight of a Friedel-Crafts catalyst at − (minus) 30° C. to + (plus) 60° C. to obtain a polymerized hydrocarbon mixture;

(B) adding 0.1 to 20 parts by weight of a basic substance to 100 parts by weight of said polymerized hydrocarbon mixture, to neutralize said polymerized hydrocarbon mixture at 10° to 100° C.;

(C) further adding an activated clay in an amount of 0.1 to 20 parts by weight based on 100 parts by weight of said polymerized hydrocarbon mixture, to treat said neutralized hydrocarbon mixture with said activated clay at 10° to 100° C.; and (D) hydrogenating said hydrocarbon mixture treated with said activated clay.

DESCRIPTION OF THE INVENTION

The process for preparing a hydrogenated hydrocarbon resin according to this invention will be described more specifically in the following description. The process of the invention includes the four steps, namely (A) the polymerization step, (B) the neutralization step, (C) the step of treating with an activated clay and (D) the hydrogenation step.

(A) Polymerization Step:

The hydrocarbon mixtures used in this invention include hydrocarbon oils obtained by cracking of petroleum or the like, i.e. by-product oils having the boiling points ranging within from 140° to 280° C. and obtained at the cracking processes including a so-called steam cracking, thermal cracking, catalytic cracking and sand cracking for cracking light and heavy naphtha, kerosene, gas oil, heavy oil fractions or crude oil to prepare α-olefins such as ethylene and propylene. For example, a fraction having a boiling point of from 150° to 180° C. or a fraction having a boiling point of from 165° to 170° C. may be used as the by-product oils. A mixture of respective distilled fractions obtained by dividedly distilling the cracked oils ranging within the boiling temperatures as defined above, can be also used as the hydrocarbon mixture. The cracking may be effected at a temperature of 300° to 1100° C., preferably 600° to 900° C. The fractions having boiling points of from 140° to 280° C. contain large amounts of styrene, indene and derivatives thereof. If the fractions having boiling points of less than 140° are used, the softening point of the resultant resin is lowered, and the physical properties, such as tensile stress and tension strength, of the composition are deteriorated is such a resin is used in said composition.

The phenols which is present at the polymerization step include those having intramolecular phenolic —OH groups and having 6 to 20 carbon atoms, the examples being phenol and alkyl-substituted phenols such as cresol, xylenol, p-tert-butylphenol, p-octylphenol and nonyl-phenol. The amount of the phenols present in the polymerization step ranges 0.1 to 3.0 parts by weight, preferably 0.5 to 2 parts by weight based on 100 parts by weight of the hydrocarbon mixture.

Representative examples of the Friedel-Crafts catalyst are boron trifluoride and aluminum chloride, and a variety of complexes thereof, such as complexes thereof with ethers and lower alcohols, may be used. The quantity of the catalyst is, in general, 0.01 to 5 parts, preferably 0.1 to 3 parts by weight based on 100 parts by weight of the hydrocarbon mixture.

Phenols may be fed in the form of phenol complexes of the Friedel-Crafts catalysts. Although it is not convenient to feed the entire quantity of phenol in the form of phenol complex, since the quantity of catalyst becomes too large if the entire quantity of phenol is fed in the form of phenol complex, it is preferred that a portion of phenol is fed in the form of phenol complex and the remaining portion thereof is added to the polymerization system without forming a complex.

These materials and catalyst for polymerization may be contained in a polymerization reactor and subjected to a continuous or batch polymerization step generally at − (minus) 30° to + (plus) 60° C., preferably 0° to 60° C.

(B) Neutralization Step:

0.1 to 20 parts by weight preferably 0.5 to 10 parts by weight of a basic substance is added to 100 parts by weight of the polymerized hydrocarbon mixture obtained through the aforementioned polymerization reaction to neutralize the same at 10° to 100° C., preferably 20° to 80° C. The reaction time for this neutralization step is 10 to 180 minutes, preferably 30 to 120 minutes. The basic substances used in the process of this invention include calcium hydroxide, sodium hydroxide, potassium hydroxide and aqueous ammonia, preferable being calcium hydroxide. After this neutralization step, the mixture is washed with water, if necessary. However, in case where calcium hydroxide is used, the mixture may be treated only through filtering step immediately after the neutralization step or after being treated with the activated clay, and the washing step may be dispensed with.

(C) Step of Treating with Activated Clay:

Commonly employed techniques for treating petroleum or the like with an activated clay may be applied to this step of the process of this invention. These known techniques are disclosed, for example, by Chikahiko Maki et al, "Sekiyu Seisei Gijutsu Binran" ("Handbook of Petroleum Refining Technology"), published by Sangyo-Tosho, pp. 77 et seq.; by Sekiyu Gakkai (Society of Petroleum Science), "Sekiyu Seisei Process" ("Petroleum Refining Process"), published by Saiwai Shobo, pp. 382 et seq.; and by Nippon Nendo Gakki (Society of Japanese Clay Science), "Nendo handbook" ("Handbook of Clay"), published by Gihodo, pp. 768 et seq.

Specifically, 0.1 to 20 parts by weight, preferably 0.5 to 10 parts by weight of activated clay is added to 100 parts by weight of the polymerized hydrocarbon mixture and treated with said activated clay at 10° to 100° C., preferably 20° to 80° C. for 10 to 180 minutes, preferably 30 to 120 minutes.

After this step of treating with activated clay, the hydrocarbon mixture is filtered or distilled to remove the activated clay and unreacted materials.

(D) Hydrogenation Step:

The hydrocarbon mixture immediately after the step of treating with the activated clay or through an additional step of distilling off the unreacted materials, is dissolved in a solvent and then subjected to a hydrogenation treatment. The hydrogenation treatment may be effected continuously or through a batch process using a known catalyst under conventional conditions. In detail, catalysts which may be used in this step include metals of the Groups VI and VIII of the periodic table, such as nickel, palladium, platinum, cobalt, rhuthenium and rhodium, and the oxides and sulfides of the metals set forth above. It is preferred that these catalysts are used while being carried by a carrier, such as alumina and diatomaceous earth. The reaction temperature of this step is 40° to 400° C., preferably 150° to 300° C., and the reaction pressure ranges 10 to 400 kg/cm$^2$, preferably 30 to 250 kg/cm$^2$. Examples of the solvent used in this step are cyclohexane, n-hexane and n-heptane. The degree of hydrogenation may be selected depending on the desired hue, tackifying property and miscibility of the resultant hydrogenated hydrocarbon resin. For instance, the degree of hydrogenation may be such that the double bonds at the side chains of the resinous polymers are completely saturated, or such that a portion or all of the aromatic rings of the resinous polymers are hydrogenated.

The most important feature of this invention resides in that the polymerized hydrocarbon mixture is subjected to the treatment with an activated clay. Needless to mention to the process wherein the step of treating with an activated clay is not included, the advantageous effects attainable by this invention, i.e. formation of a hydrogenated hydrocarbon resin having an improved miscibility with a high molecular polymer and excellent heat resistant property and hue, cannot be obtained by treating the hydrocarbon mixture with an activated clay prior to polymerization. By treating the hydrocarbon mixture with an activated clay after it has been polymerized, substances which act as poisons to the catalyst used in the hydrogenation step can be removed so that the activity and life-time of the catalyst can be remarkably prolonged.

EXAMPLES OF THE INVENTION

This invention will now be described more specifically with reference to an Example and Comparative Examples. The test method for determining the physical and chemical properties are as follows.

Test Methods:
(1) Softening Point (Ring and Ball Test):
   In accordance with JIS K-2531, the results are shown in °C.
(2) Hue of Molten Resin:
   Determined in accordance with the Gardener Test (ASTM D-1544-68).
(3) Bromine Value:
   Determined by the ASTM D-1158-59T Method and shown in g/100 g unit.
(4) Heat Resistant Property:
   The hue after treated at 250° C. for 3 hours was determined in accordance with the Gardner Test set forth item (2) above.
(5) Adhesive Power:
   Each of the resins was applied on and sandwiched under pressure between aluminum plates each having a thickness of 0.1 mm and a width of 25 mm so that the thickness of the adhesive layer became 0.2 mm, the conditions for pressing operation being at 180° C. for 3 minutes. The thus obtained test piece was allowed to stand at 20°±1° C., 60% RH, for 24 hours, and then subjected to the T-peeling test (Peeling Rate: 150 mm/min.) using a Tensilon type tensile testing machine. The results are shown in g/25 mm unit.

(6) Appraisal of Hue of Hot-Melt Adhesive:

The hue of each of the hot-melt adhesives prepared and solidified was judged in accordance with the following standard for judement:

White: o Light Yellow: Δ Yellow to Brown: x

EXAMPLE 1

100 parts by weight of cracked fraction having boiling points ranging within 140° to 280° C., which had been obtained as by-products of the steam cracking of naphtha, were polymerized in the presence of 2 parts by weight of phenol and 0.6 parts by weight, based on 100 parts of the cracked oil fractions, of boron trifluoride phenolate at 30° for 3 hours.

Then 2 parts by weight of calcium hydroxide was added to 100 parts by weight of the polymerized hydrocarbon mixture under agitation at 70° C. for an hour to neutralize the mixture, and then 5 parts by weight of an activated clay (available from Mizusawa Kagaku Co., Ltd. under the Trade Name of Galleon Earth NS) was added and continued to agitate for 30 minutes to treat the mixture with the activated clay. After the step of treating with the activated clay, the treated mixture was filtered to obtain 97 parts by weight of a polymerized hydrocarbon mixture having a hue (Gardner) of 3.

The thus obtained polymerized hydrocarbon mixture was hydrogenated in the presence of 0.3 grams of a nickel-diatomaceous earth catalyst at 230° to 260° C. for 4 hours under a hydrogen pressure of 40 kg/cm$^2$. After the completion of hydrogenation, the mixture was cooled, the catalyst was filtered off and then the mixture was distilled under reduced pressure to remove hydrogenated but unpolymerized monomers and oligomers, whereby a hydrogenated hydrocarbon resin (I-A) was obtained.

COMPARATIVE EXAMPLE 1

To 100 parts by weight of the same starting hydrocarbon mixture as used in Example 1 was added 0.6 parts of boron trifluoride phenolate, and then polymerized at 30° C. for 3 hours. The catalyst was removed by an aqueous solution of caustic soda followed by washing with water to obtain 94 parts by weight of a polymerized hydrocarbon mixture having a hue (Gardner) of 7.

The polymerized hydrocarbon mixture was distilled to remove unreacted fractions and oligomers to obtain a resin (F-1).

COMPARATIVE EXAMPLE 2

The polymerized hydrocarbon mixture obtained similarly to Comparative Example 1 was hydrogenated in accordance with the same procedure as in Example 1 to obtain a hydrogenated resin (F-2).

COMPARATIVE EXAMPLE 3

To 100 parts by weight of the polymerized hydrocarbon mixture obtained similarly to Comparative Example 1 was added 5 parts by weight of the same activated clay as used in Example 1 to treat the mixture with the activated clay at 70° C. for 30 minutes, and then the mixture is filtered. The unpolymerized oil fractions and oligomers were distilled off to obtain a resin (F-3).

The properties of the hydrogenated hydrocarbon resin (I-A) prepared by Example 1 and the hydrocarbon resins (F-1) to (F-3) prepared by Comparative Examples 1 to 3 are shown in Table 1.

In order to know the properties of hot-melt adhesives produced by the use of the hydrocarbon resins of Example 1 and Comparative Examples 1 to 3, hot melt adhesive compositions were produced by melting and mixing the following compositions at about 180° C., and subjected to tests.

| Composition of Hot Melt Adhesive: | Parts by weight |
|---|---|
| Hydrocarbon Resin | 40 |
| Ethylene-Vinyl Acetate Copolymer (EVAFLEX #220 Produced by Mitsui Polychemical Co., Ltd.; Content of Vinyl Acetate: 28%, Melt Index: 150) | 40 |
| Paraffin Wax (Produced by Nippon Oil Company Limited; Melting Point: 145° F.) | 20 |

Each of the resins obtained by Example 1 and Comparative Examples 1 to 3 was used as the hydrocarbon resin in the composition set forth just above, and the results of test being shown in Table 1.

The hydrogenated hydrocarbon resin (I-A) of Example 1 prepared in accordance with the process of this invention was improved in hue and heat resistant property and also excellent in miscibility with another high molecular polymer. The hot melt adhesive produced by the use of the resin (I-A) was good in adhesive property and hue.

Comparatives Example 1 shows a process wherein the treatment with an activated clay and the hydrogenation treatment were excluded, Comparative Example 2 shows a process wherein the treatment with an activated clay was excluded, and Comparative Example 3 shows a process wherein the hydrogenation treatment was omitted. The hydrocarbon resins (F-1) to (F-3) prepared by these Comparative Examples 1 to 3 were unsatisfactory in either or both of the hue and heat resistant property. Further, the hot melt adhesives produced by the use of these resins (F-1) to (F-3) were unsatisfactory in either or both of the hue and adhesive property.

TABLE 1

| | | Ex. 1 I-A | Comp. Ex. 1 F-1 | Comp. Ex. 2 F-2 | Comp. Ex. 3 F-3 |
|---|---|---|---|---|---|
| Properties of Hydrocarbon Resin | Softening Point (°C.) | 105 | below 125 | 110 | 122 |
| | Hue of Molton Resin | 1 | 9 | 1 | 6 |
| | Bromine Value | 6 | 35 | 11 | 37 |
| | Heat Resistant Property | 4 | 16 | 7 | 15 |
| Properties of Hot-Melt Adhesive | Adhesive Power (g/25 mm) | 1600 | 200 | 800 | 500 |
| | Hue | o | x | o | x |

Although the present invention has been described by referring to a preferred example thereof, it should be apparent to those skilled in the art that many modifications and changes may be made without departing from the spirit and scope thereof. The example referred to hereinbefore is, therefore, to be considered in all respects as illustrative only and not restrictive. The scope of the invention should be limited only by the appended claims, and all changes or equivalents which come within the meaning and range of the claims are to be embraced therein.

What is claimed is:

1. A process for preparing a hydrogenated hydrocarbon resin comprising the steps of:
   (A) polymerizing 100 parts by weight of a hydrocarbon mixture containing fractions of cracked oils obtained by cracking of petroleum and having boiling points ranging within from 140° to 280° C., said polymerization being effected in the presence of 0.1 to 3.0 parts by weight of a phenol and 0.01 to 5.0 parts by weight of a Friedel-Crafts catalyst at − (minus) to 30° C. + (plus) 60° C. to obtain a polymerized hydrocarbon mixture;
   (B) adding 0.1 to 20 parts by weight of a basic substance to 100 parts by weight of said polymerized hydrocarbon mixture, to neutralize said polymerized hydrocarbon mixture at 10° to 100° C.;
   (C) further adding an activated clay in an amount of 0.1 to 20 parts by weight based on 100 parts by weight of said polymerized hydrocarbon mixture, to treat said neutralized hydrocarbon mixture with said activated clay at 10° to 100° C.; and
   (D) hydrogenating said hydrocarbon mixture treated with said activated clay.

2. A process as claimed in claim 1, wherein said fractions of cracked oils are by-product oils having boiling points ranging within from 140° to 280° C. and obtained at the cracking step of cracking light and heavy naphtha, kerosene, gas oil, heavy oil fraction and crude oil to prepare α-olefins.

3. A process as claimed in claim 1, wherein said phenol is a phenolic compound having a intromolecular phenolic —OH group and having 6 to 20 carbon atoms.

4. A process as claimed in claim 3, wherein said phenol is selected from the group consisting of phenol, cresol, xylenol, p-tert-butylphenol, p-octylphenol, nonyl-phenol and mixtures thereof.

5. A process as claimed in claim 1, wherein said Friedel-Crafts catalyst is selected from a group consisting of boron trifluoride and aluminium chloride.

6. A process as claimed in claim 1, wherein at least a portion of said phenol is a complex of phenol with said Friedel-Crafts catalyst.

7. A process as claimed in claim 1, wherein said basic substance is selected from the group consisting of calcium hydroxide, sodium hydroxide, potassium hydroxide and aqueous ammonia.

8. A process as claimed in claim 1, wherein said hydrogenation step (D) is carried out by the use of a catalyst carried by a carrier and selected from the group consisting of metals of the Groups VI and VIII of the periodic table, the oxides of said metals, sulfides and said metals and mixtures thereof.

9. A process as claimed in claim 8, wherein said metals of said Groups VI and VIII of the periodic table are selected from the group consisting of nickel, palladium, platinum, cobalt, ruthenium, rhodium, and mixtures thereof.

10. A process as claimed in claim 8, wherein said carrier is selected from the group consisting of alumina and diatomaceous earth.

11. A process as claimed in claim 1, wherein said hydrogenation steps (D) is carried out at a reaction temperature of from 40° to 400° C. and under a reaction pressure of 10 to 400 kg/cm$^2$.

* * * * *